(12) United States Patent
Pecak et al.

(10) Patent No.: US 12,072,025 B2
(45) Date of Patent: Aug. 27, 2024

(54) AXIAL SEAL ASSEMBLY WITH HINGED LIP

(71) Applicant: AKTIEBOLAGET SKF, Gothenburg (SE)

(72) Inventors: Robert D. Pecak, Naperville, IL (US); John Arthur Wilkins, Chicago, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 13 days.

(21) Appl. No.: 17/702,289

(22) Filed: Mar. 23, 2022

(65) Prior Publication Data
US 2022/0316595 A1 Oct. 6, 2022

Related U.S. Application Data

(60) Provisional application No. 63/170,912, filed on Apr. 5, 2021.

(51) Int. Cl.
*F16J 15/32* (2016.01)
*F16J 15/3228* (2016.01)

(52) U.S. Cl.
CPC ................ *F16J 15/3228* (2013.01)

(58) Field of Classification Search
CPC .................................................. F16J 15/3228
See application file for complete search history.

(56) References Cited

U.S. PATENT DOCUMENTS

| | | | | |
|---|---|---|---|---|
| 4,928,979 A | * | 5/1990 | Nagasawa | F16J 15/3264 277/424 |
| 6,273,428 B1 | * | 8/2001 | Sassi | F16J 15/3256 277/374 |
| 8,403,333 B2 | * | 3/2013 | Berdichevsky | F16J 15/164 277/433 |
| 10,738,891 B2 | * | 8/2020 | Breusa | F16J 15/3284 |
| 2003/0006563 A1 | * | 1/2003 | Cater | F16J 15/3456 277/549 |

(Continued)

FOREIGN PATENT DOCUMENTS

JP H0493571 U * 8/1992
JP H0734260 U * 6/1995

*Primary Examiner* — Vishal A Patel
(74) *Attorney, Agent, or Firm* — J-TEK LAW PLLC; Scott T. Wakeman; Mark A. Ussai

(57) ABSTRACT

An axial seal assembly is for sealing against a radial engagement surface of an outer member or an inner member disposed within a bore of the outer member. The seal assembly includes an annular case coupled with the outer member or disposed about the inner member and an annular elastomeric seal body. The seal body includes an inner portion attached to the case and an outer portion extending axially and radially from the inner portion so as to be positionable generally parallel to the radial engagement surface. The outer portion has a contact section extending generally axially from a remainder of the outer portion and being sealingly engageable with the radial engagement surface, the seal body outer portion being bendable about the seal body inner portion such that the seal body outer portion remains parallel to the engagement surface during axial displacement between the annular case and the engagement surface.

5 Claims, 12 Drawing Sheets

(56) References Cited

U.S. PATENT DOCUMENTS

2005/0089254 A1\* 4/2005 Takehara ................ B60B 27/00
   384/484
2007/0201782 A1\* 8/2007 Miyagawa .......... F16C 33/7879
   277/351

\* cited by examiner

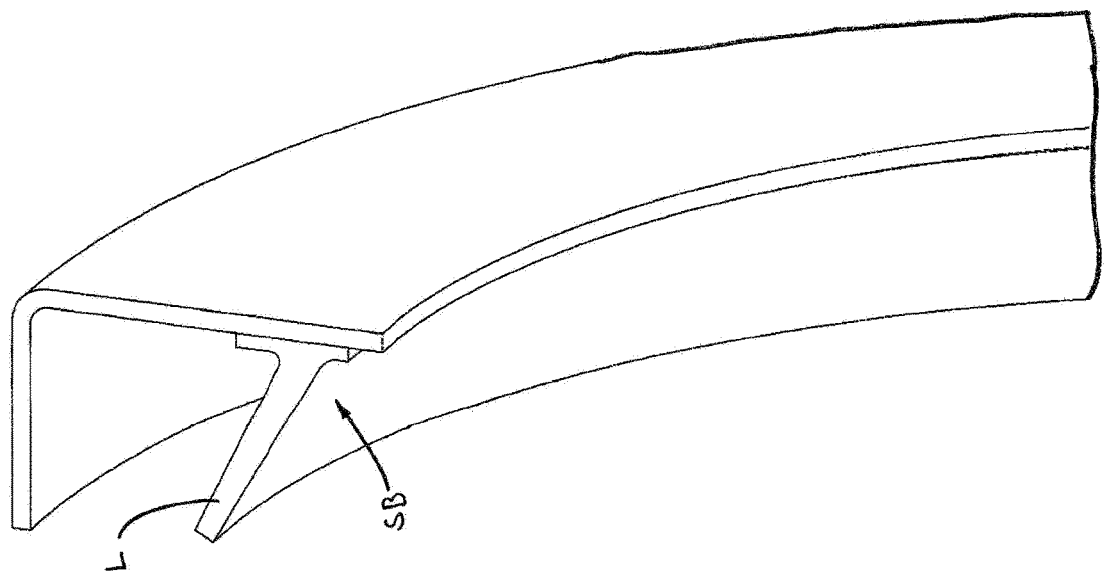
FIG. 6 - Prior Art
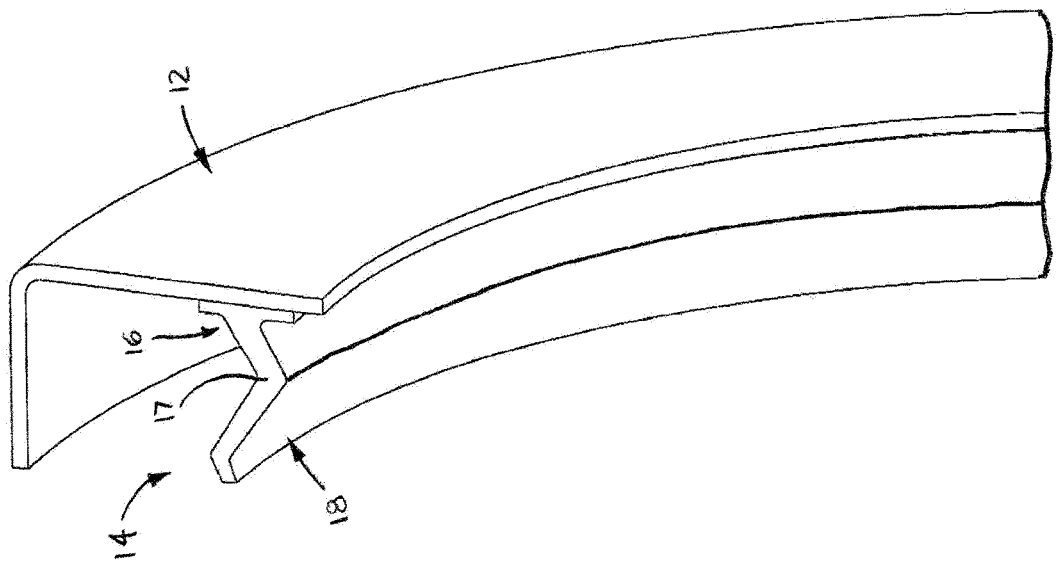
FIG. 5

AXIAL SEAL ASSEMBLY WITH HINGED LIP

CROSS-REFERENCE

This application claims the benefit of U.S. Provisional Application No. 63/170,912 filed Apr. 5, 2021.

BACKGROUND OF THE INVENTION

The present invention relates to seals, and more particularly to axial seals for sealing against radial surfaces.

Axial seals are often provided in combination with a seal assembly including one or more radial lip seals for sealing inwardly against an inner member, such as a rotatable shaft, or outwardly against an outer member, such as a rotatable hub. Such axial seals typically include an annular elastomeric body SB having an inner end connected with a seal case and an outer end sealingly engaged with a radial surface located adjacent to the seal assembly and provided by a generally "straight" lip L, as shown in FIG. 6. To accommodate varying axial distances between the seal assembly case and the radial surface in different applications, the lip L of the elastomeric body may be circumferentially stretched in a radially outward direction, which increases loading within the seal body SB, such that the seal outer end may be located within a relatively wide range of radial positions.

SUMMARY OF THE INVENTION

In one aspect, the present invention is an axial seal assembly for sealing against a radial engagement surface, the radial engagement surface extending from or formed on either an outer member or an inner member disposed within a bore of the outer member, the inner member or the outer member being rotatable about a central axis extending through the inner member. The seal assembly comprises an annular case coupleable with the bore of the outer member or disposable about and coupled with the inner member and an annular elastomeric seal body. The elastomeric seal body includes an inner portion attached to the annular case and an outer portion extending axially and radially from the inner portion so as to positionable generally parallel to the radial engagement surface. The outer portion has a contact section extending generally axially from a remainder of the outer portion and is sealingly engageable with the radial engagement surface. The seal body outer portion is configured to bend with respect to the seal body inner portion such that the seal body outer portion remains generally parallel to the engagement surface during relative axial displacement between the annular case and the engagement surface.

In another aspect, the present invention is again an axial seal assembly for sealing against a radial engagement surface, the radial engagement surface extending from or formed on an outer member or an inner member disposed within a bore of the outer member, the inner member or the outer member being rotatable about a central axis extending through the inner member. The seal assembly comprises an annular case coupleable with the bore of the outer member or disposable about and coupled with the inner member and an annular elastomeric seal body. The seal body has an inner portion connected with the case, a central hinge portion connected with the inner portion, and an outer portion extending axially and radially from the hinge portion and having a free end sealingly engageable with the radial engagement surface, the hinge portion being configured to permit axial displacement of the outer portion with respect to the inner portion.

In a further aspect, the present invention is again an axial seal assembly for sealing between an outer member and an inner member disposed within a bore of the outer member, the inner member or the outer member being rotatable about a central axis extending through the outer member. The seal assembly comprises a first annular case having an axial portion coupled with the bore of the outer member or disposed about and coupled with the inner member and a radial portion extending radially from the axial portion. A second annular case has an axial portion disposed about and coupled with the inner member or coupled with the bore of the outer member and a radial portion extending radially from the axial portion and providing an engagement surface. An annular elastomeric seal body includes an inner portion molded to the first case radial portion and an outer portion extending axially and radially from the seal body inner portion so as to positionable generally parallel to the radial engagement surface of the second case radial portion. The seal body outer portion has a contact section extending generally axially from a remainder of the outer portion and is sealingly engageable with the radial engagement surface. The seal body outer portion is configured to displace generally axially with respect to the first case while the contact section remains generally stationary relative to the engagement surface of the second case.

BRIEF DESCRIPTION OF THE SEVERAL VIEWS OF THE DRAWING

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 4, are each a view of portion of FIG. 1, showing the first construction seal assembly at two different axial distances between the case and the radial engagement surface;

FIG. 5 is a broken-away, perspective view of the first construction axial seal assembly shown non-engaged with a radial surface;

FIG. 6 is a broken-away, perspective view of a prior art axial seal assembly shown non-engaged with a radial surface;

DETAILED DESCRIPTION OF THE INVENTION

Figure 1:
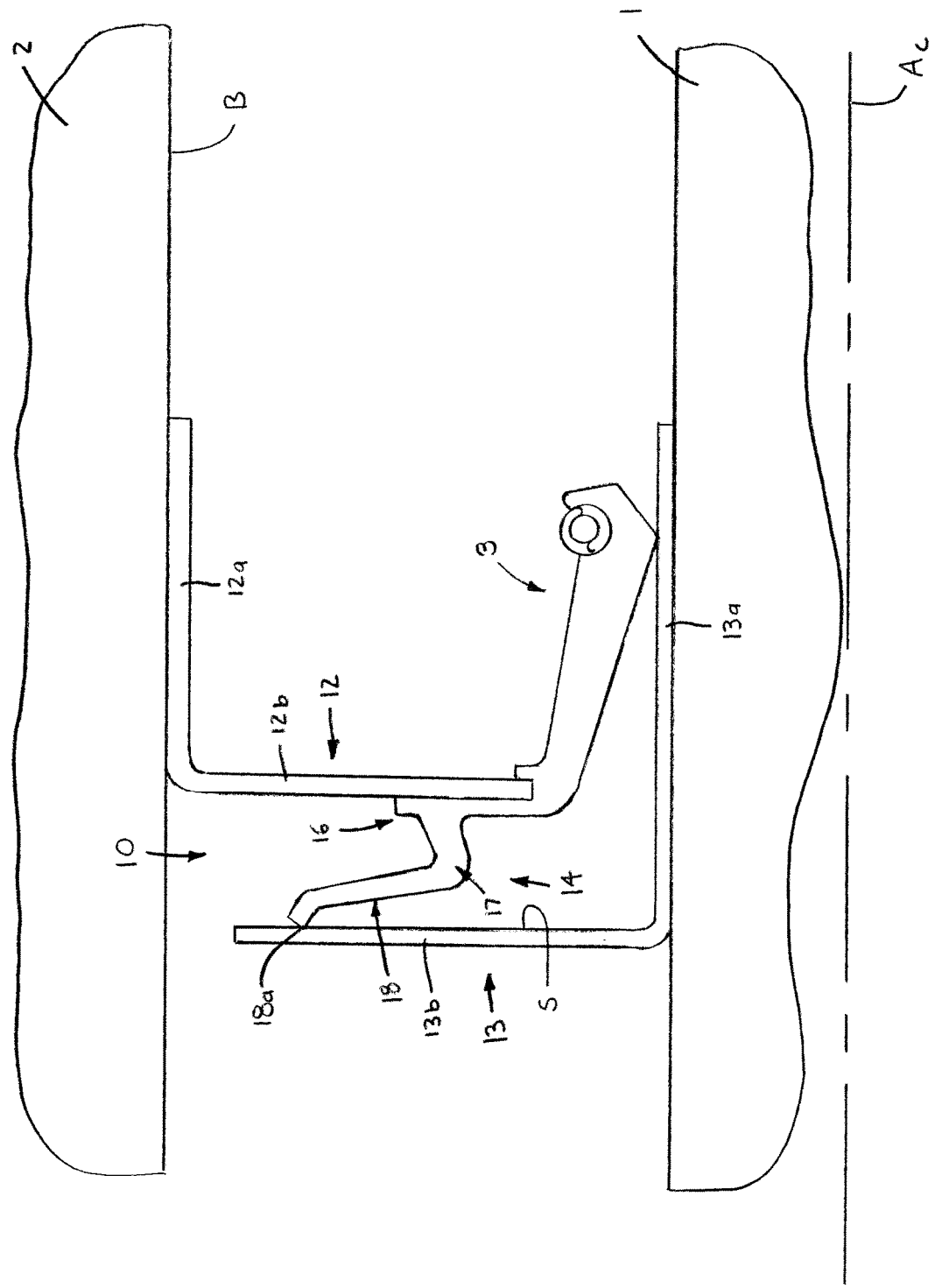
FIG. 1 is a broken-away, axial cross-sectional view of a first construction seal assembly in accordance with the present invention.
Figure 2:
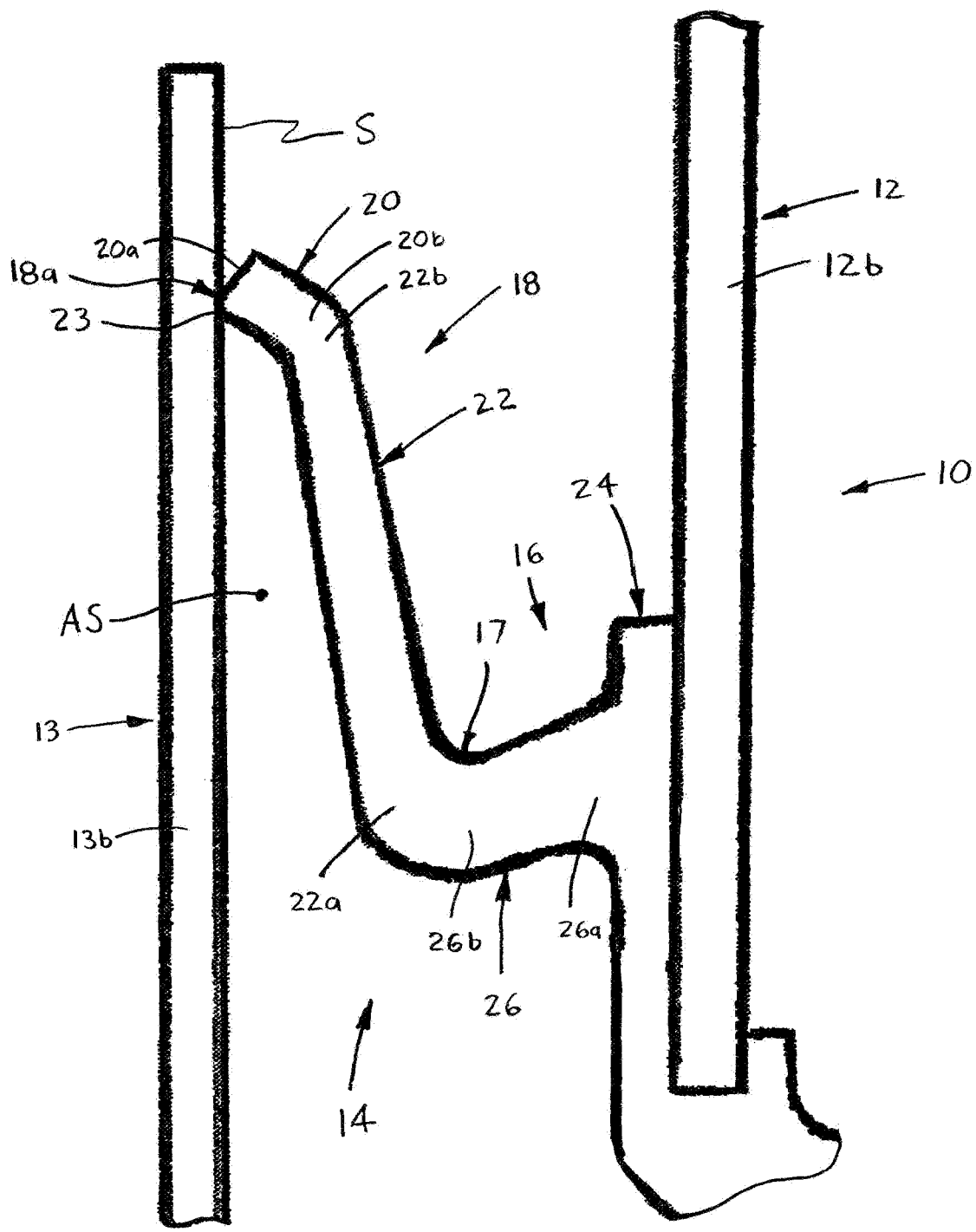
FIG. 2 is a broken-away, enlarged view of a portion of FIG. 1.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-5 and 7-13 an axial seal assembly 10 for sealing against a radial engagement surface S, the radial engagement surface S extending from or formed on an outer member 2 or an inner member 1 disposed within a bore B of the outer member 2. Preferably, the inner member 1 is a shaft rotatable about a central axis $A_C$ and the outer member 2 is a "fixed" (i.e., non-rotatable about the axis $A_C$) housing, frame, casing, etc. of a machine or other mechanical assembly. Alternatively, the outer member 2 is a hub or other component/assembly that is rotatable about a fixed inner member 1, such as a static axle. In either case, the seal assembly 10 basically comprises an annular case 12 coupleable with the bore B of the outer member 2, or disposable about and coupled with the inner member 1, so as to be spaced axially from the engagement surface S, and an annular elastomeric seal body 14 attached to the case 12 and sealingly engageable with the radial engagement surface S. The annular case 12 is preferably a first annular case and the seal assembly 10 preferably includes another or second annular case 13 providing the engagement surface S, as discussed below. Alternatively, the seal assembly 10 may be formed without a second annular case, such that the radial engagement surface S is instead provided on a radial shoulder of the inner member 1 or the outer member 2 or by a separate annular member disposed about the inner member 1 or coupled with the outer member 2 (no alternatives shown).

More specifically, the seal body 14 includes an inner axial portion 16 attached to the annular case 12 and an outer axial portion 18 extending axially and radially from the inner portion 16, either radially outwardly in a first and a fourth seal construction or radially inwardly in a second and a third seal construction, so as to be positionable generally parallel to the radial engagement surface S. The outer portion 18 has a contact section 20 extending generally axially from a remainder of the outer portion 18 and is sealingly engageable with the radial engagement surface S. Further, the seal body outer portion 18 is configured to bend with respect to the seal body inner portion 16 such that the seal body outer portion 18 remains generally parallel to the engagement surface S during relative axial displacement between the annular case 12 and the engagement surface S. As such, the contact section 20 remains generally at a fixed radial position on the engagement surface S, or at least displaces by a minimal radial distance, during such relative axial displacement of the case 12 and the surface S.

Figure 7:
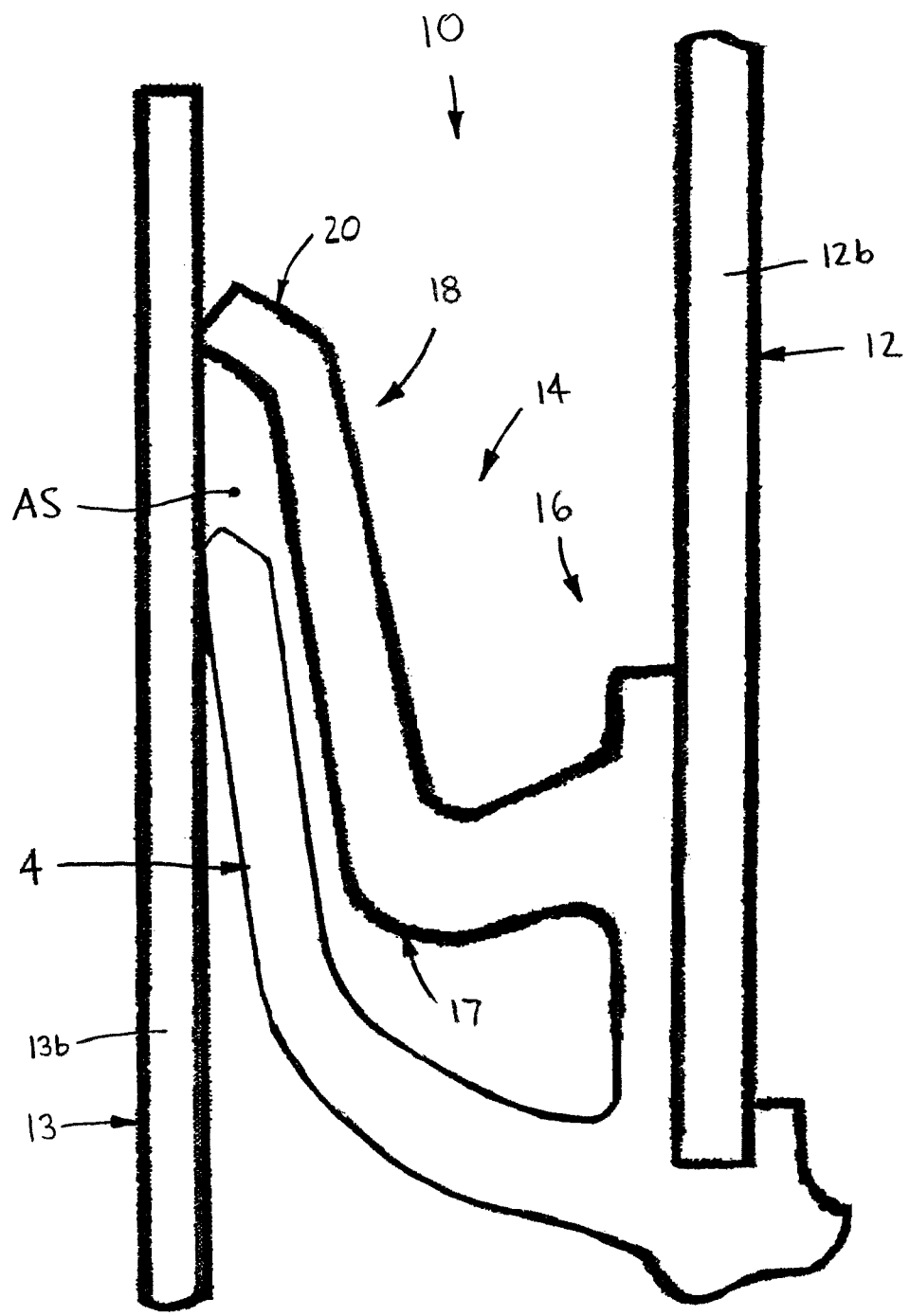
FIG. 7 is a broken-away, axial cross-sectional view of the first construction axial seal assembly of the present invention, shown with an additional conventional axial seal lip.
Figure 8:
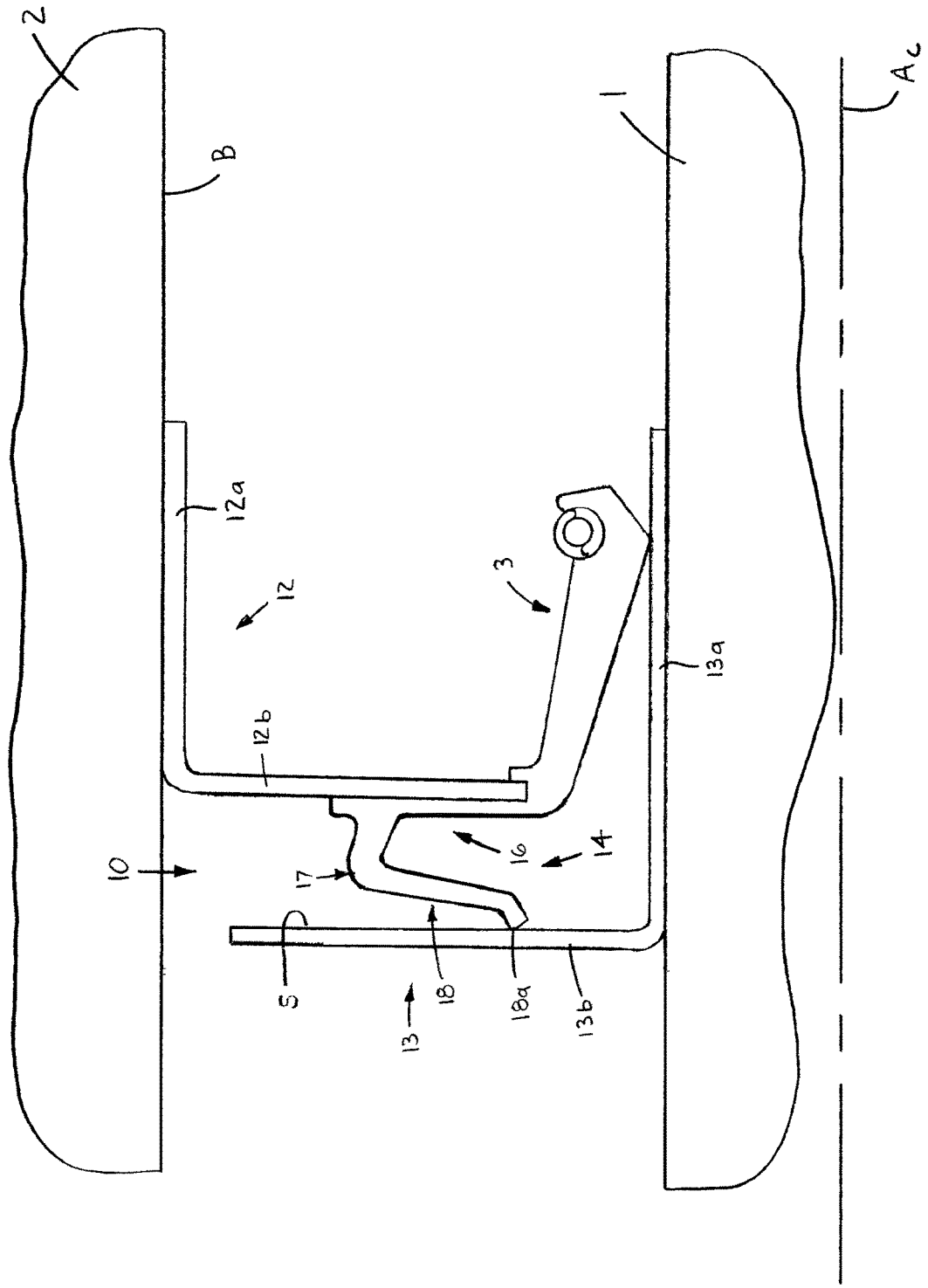
FIG. 8 is a broken-away, axial cross-sectional view of a second construction seal assembly in accordance with the present invention.
Figure 9:
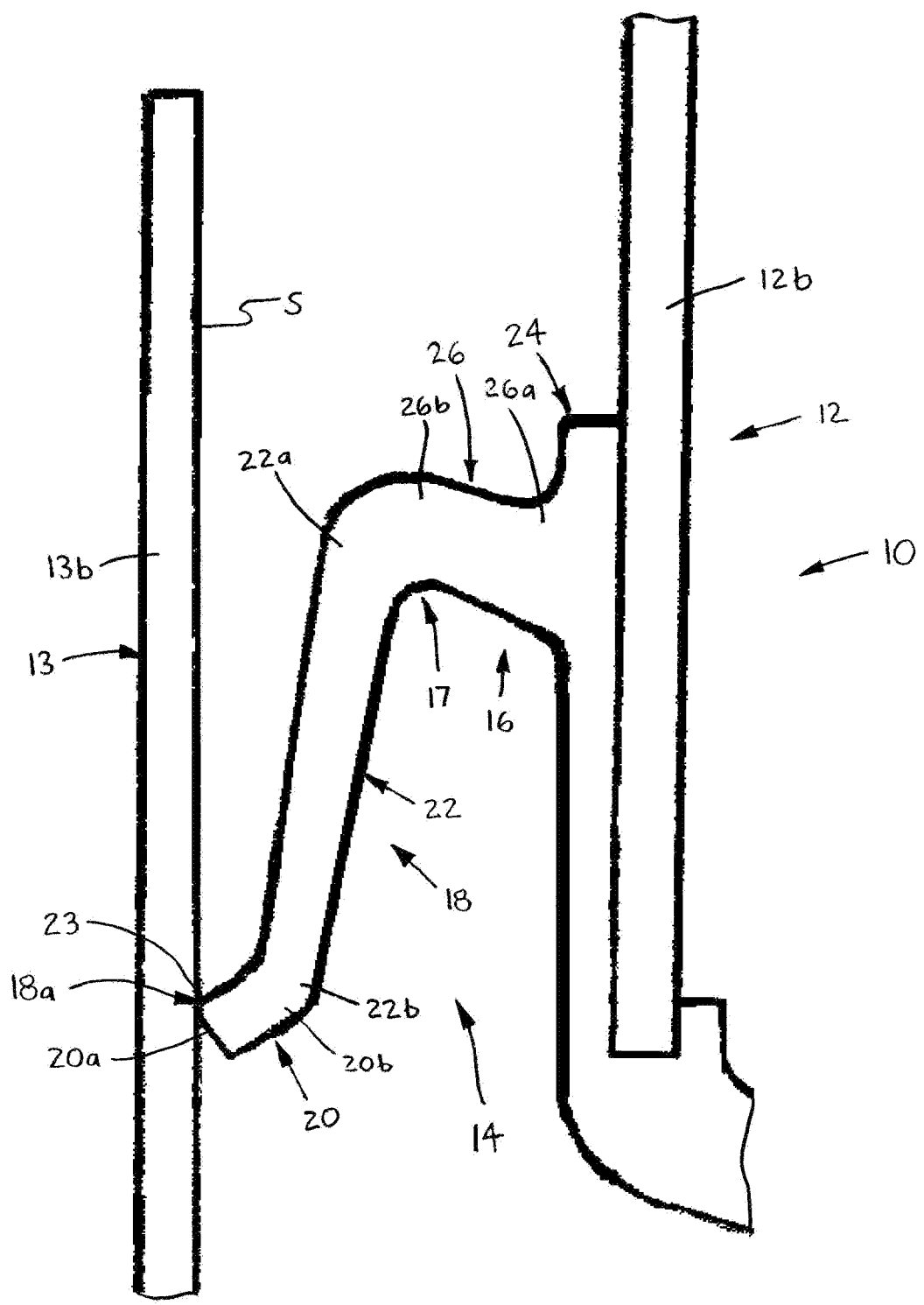
FIG. 9 is a broken-away, enlarged view of a portion of FIG. 8.

In a first, presently preferred construction shown in FIGS. 1-5 and 7 and a second construction shown in FIGS. 8 and 9, the first annular case 12 is an outer annular case and includes an axial portion 12a frictionally engageable with the outer member bore B and a radial portion 12b extending radially inwardly from the axial portion 12a, the seal body 14 being connected, preferably by molding, to the case radial portion 12b. The other or second annular case 13 is preferably an inner annular case with an axial section 13a disposable about and coupled with the inner member 1 and a radial portion 13b extending radially outwardly from the axial portion 13a and providing the radial engagement surface S, the second case radial portion 13b being spaced axially from the first case radial portion 12b.

Figure 10:
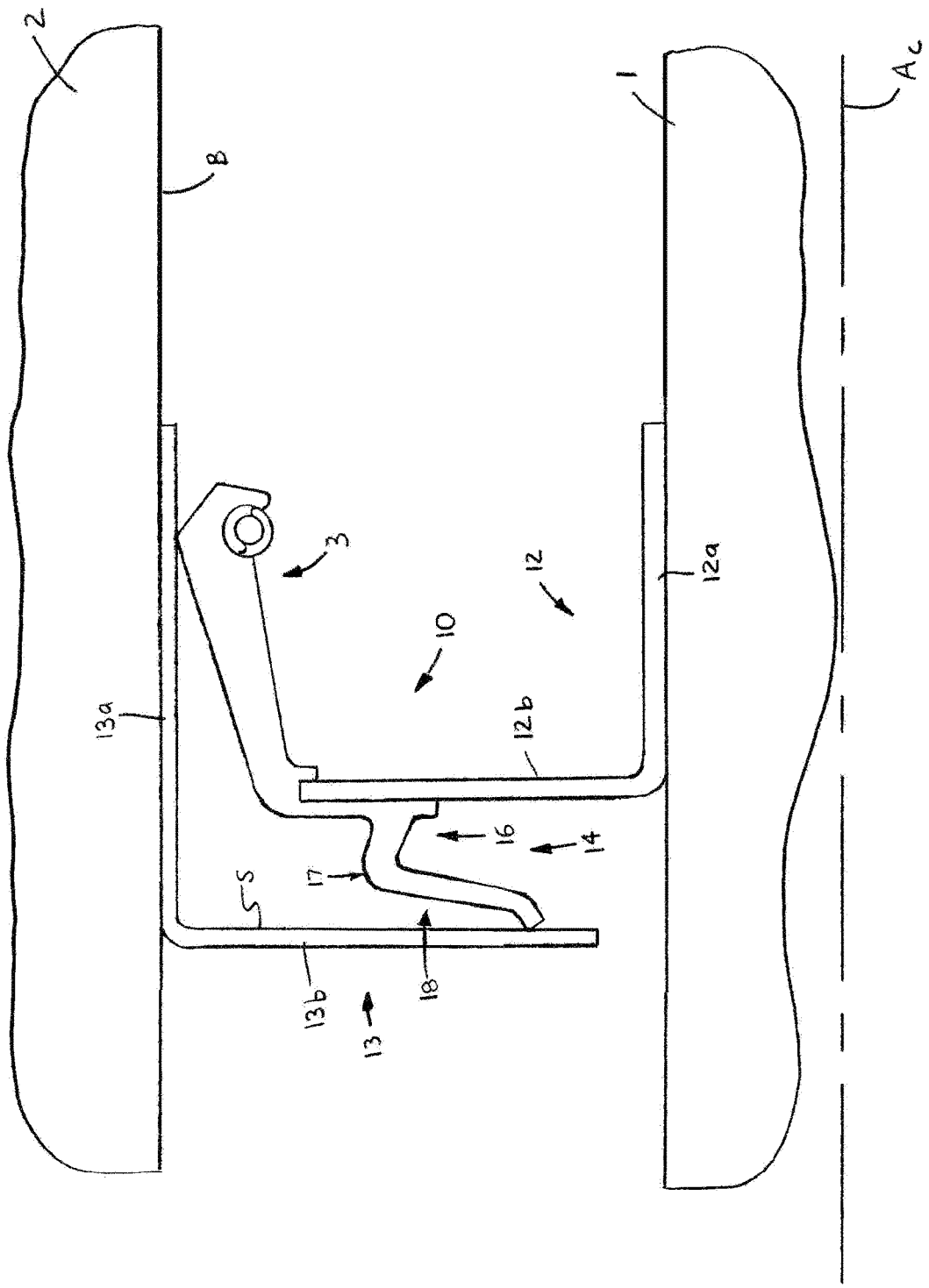
FIG. 10 is a broken-away, axial cross-sectional view of a third construction seal assembly in accordance with the present invention.
Figure 11:
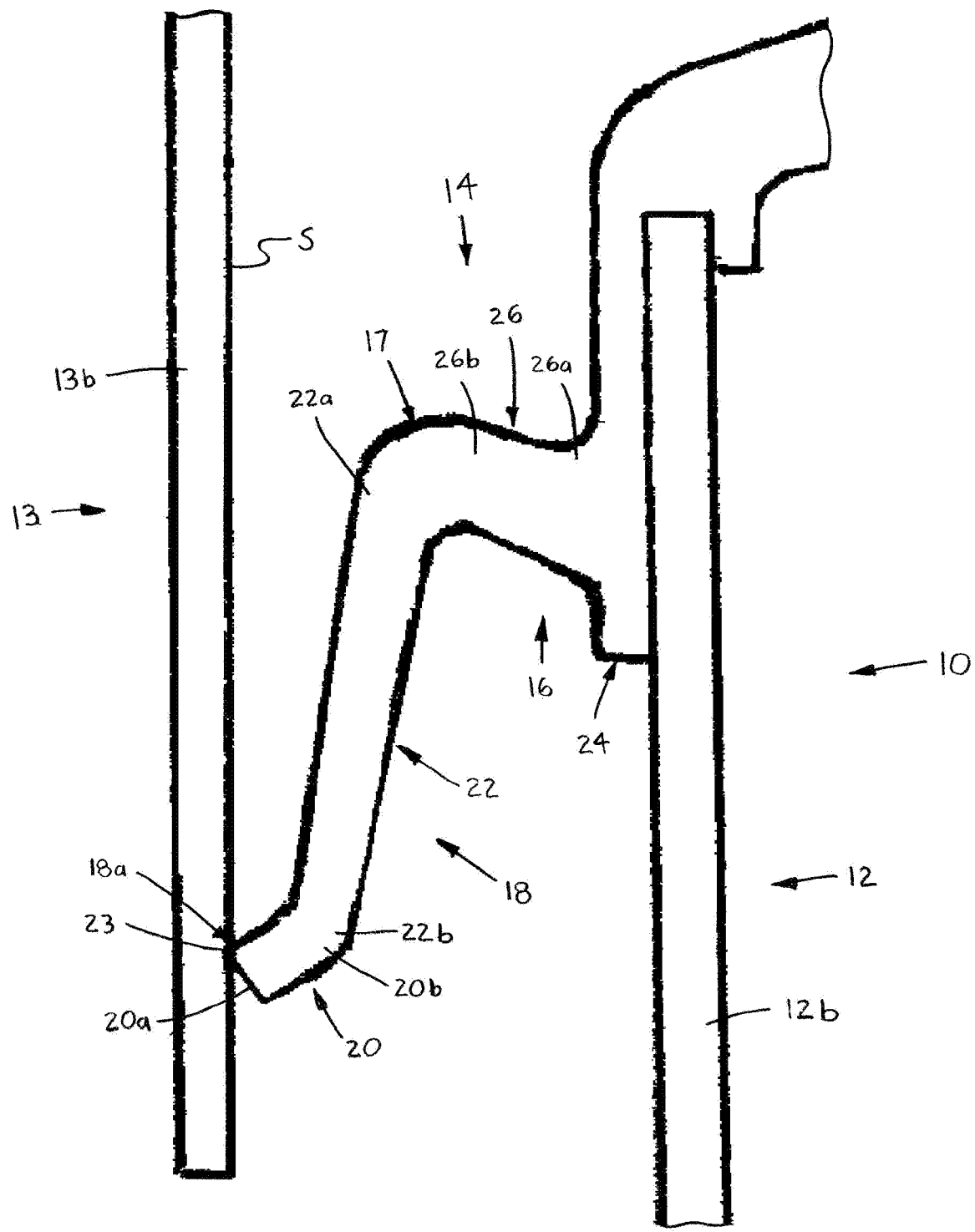
FIG. 11 is a broken-away, enlarged view of a portion of FIG. 10.
Figure 12:
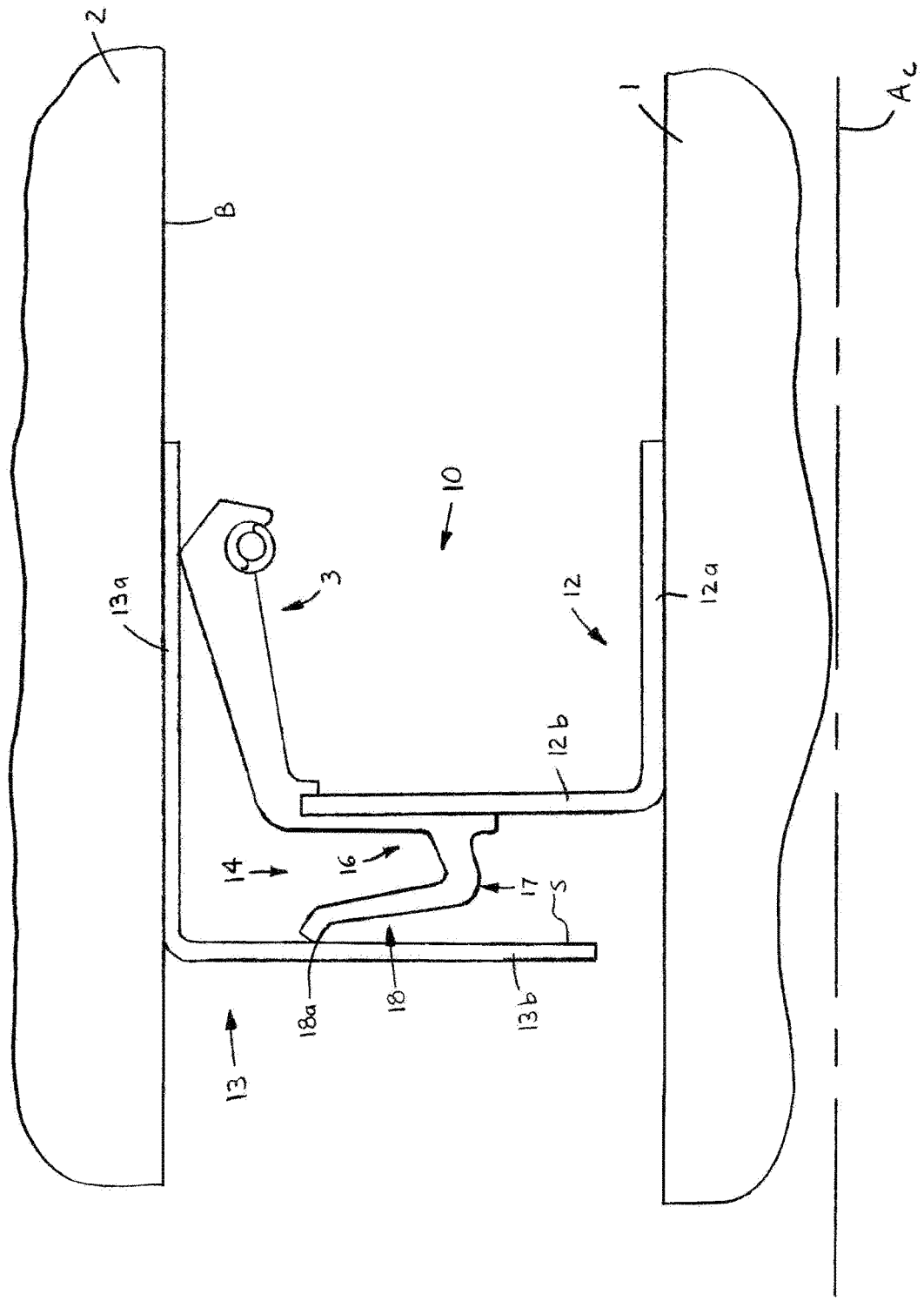
FIG. 12 is a broken-away, axial cross-sectional view of a fourth construction seal assembly in accordance with the present invention.
Figure 13:
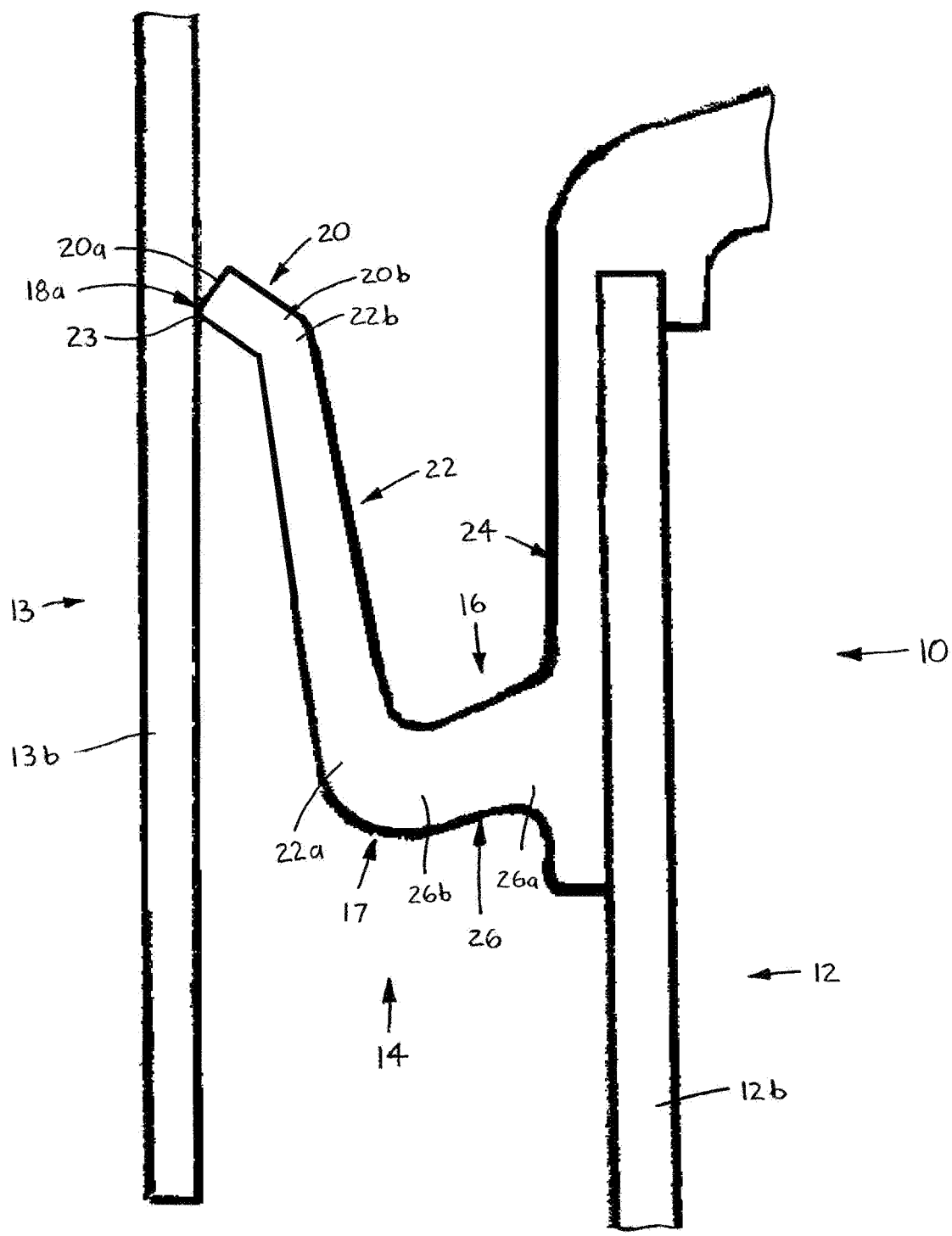
FIG. 13 is a broken-away, enlarged view of a portion of FIG. 12.

In a third construction shown in FIGS. 10 and 11 and a fourth construction shown in FIGS. 12 and 13, the first annular case 12 is an inner annular case such that the case axial portion 12 is disposable about and coupled with the inner member 1 and the radial portion 12b extends radially outwardly from the axial portion 12a. In these constructions, the second annular case 13 is an outer annular case such that the axial portion 13a is frictionally engaged with the bore B of the outer member 2 and the radial portion 13b extends radially inwardly from the axial portion 13a and is spaced axially from the first case radial portion 12b.

In any of the seal assembly constructions, the axial seal assembly 10 is preferably used in combination with one or more radial lip seals 3 (only one shown) and/or one or more conventional axial lip seals (none shown) each attached to the annular case 12. The radial seal lip seal(s) 3 or and other axial lip seals is/are preferably integrally formed with the seal body 14 as shown, but may alternatively be separately formed and separately attached to the case 12 (structure not depicted). With each construction of the preferred seal assembly 10, the radial seal lip(s) 3 are preferably sealingly engageable with the axial section 13a of the second annular case 13, but may seal directly against the inner member 1 or the outer member 2 when the seal assembly 10 is formed without the second annular case 13.

Figure 3:
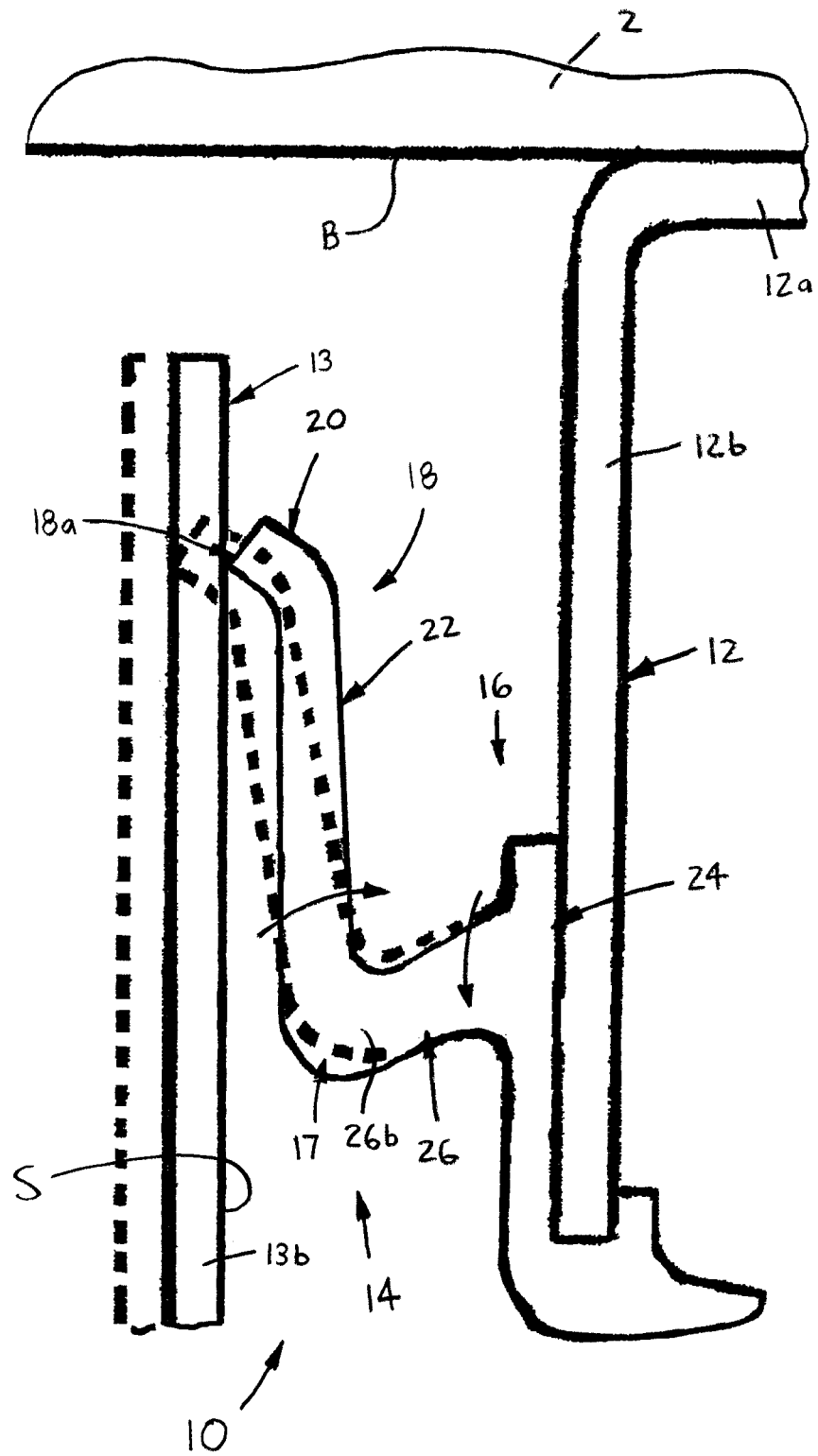
FIG. 3 is another view of FIG. 2, showing the first construction seal assembly at two different axial distances between a case and a radial engagement surface, a first position shown in solid lines and a second position shown in dashed lines.
Figure 4B:
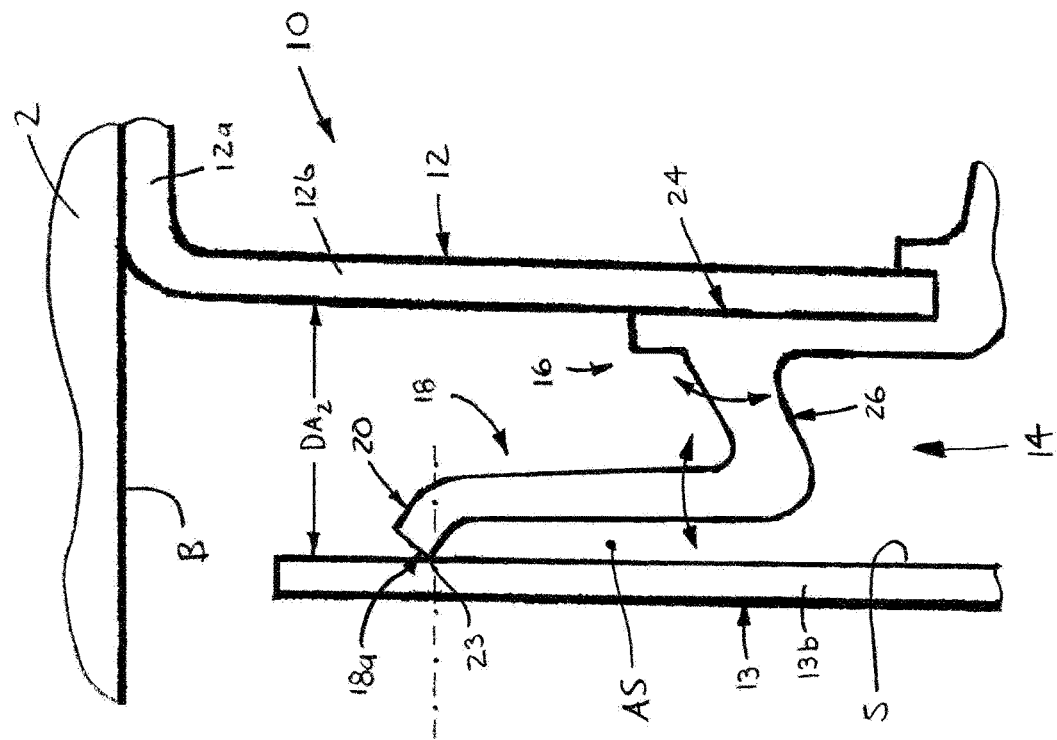
FIGS. 4A and 4B, collectively
Figure 4A:
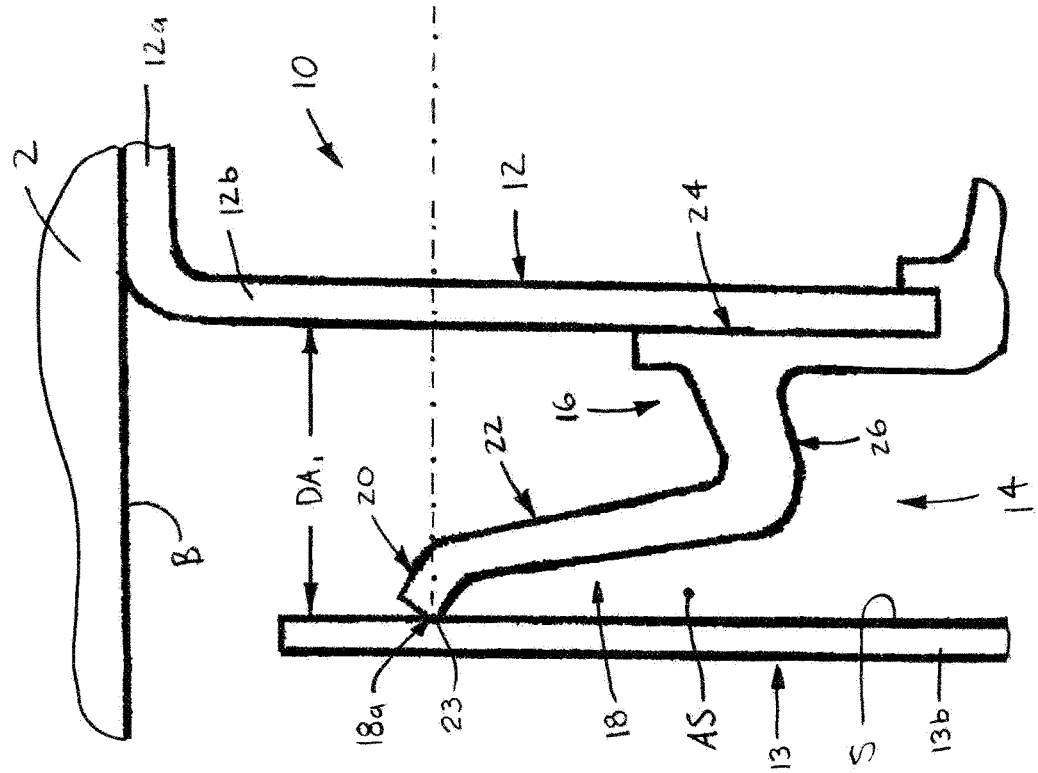

Referring to FIGS. 2-4, 9, 11 and 13, the seal body outer portion 18 has a free end 18a sealingly engageable with the radial engagement surface S, the free end 18a preferably being provided by a contact section 20 of the outer member 18 extending generally axially from a remainder of the outer portion 18. The axial contact section 20 positions or arranges the seal body outer portion 18 such that the outer body portion 18 extends generally parallel to the radial engagement surface S. Further, the seal body outer portion 18 is configured to displace generally axially with respect to the case 12 while radial movement of the contact section 20 (and thus also of the free end 18a) on the radial engagement surface S is substantially minimized when an axial distance DA between the engagement surface S (and preferably the inner case 13) and the outer annular case 12 varies as indicated in FIGS. 3 and 4; e.g., between a first distance $DA_1$ (FIG. 4A) and a second distance $DA_2$ (FIG. 4B).

In other words, the contact section 20 of the outer body portion 18 remains generally fixed or non-displaceable relative to the engagement surface S as the outer body portion 18 displaces axially during relative axial displacement between the annular case 12 and the engagement surface S. Preferably, the seal body 14 further includes a central hinge portion 17 integrally connecting the seal body outer axial portion 18 with the seal body inner axial portion 16 and configured to permit axial displacement of the outer portion 18 with respect to the inner portion 16, i.e., by bending about the hinge portion 17.

Referring to FIGS. 2, 9, 11 and 13, the seal body outer portion 18 preferably further includes an elongated section 22 with an inner end 22a connected with the seal body inner portion 16, i.e., through the hinge portion 17, and an opposing outer end 22b connected with an inner end 20b of the contact section 20. The elongated section 22 of the seal body outer portion 18 is bendable about the seal body inner portion 16 by means of the hinge portion 17 so as to displace axially relative to the annular case 12 without any substantial radial displacement. Such bending of the elongated section 22 about the hinge portion 17 enables the outer body portion contact section 20 to remain generally at a fixed radial position on the engagement surface S as described above, although some limited radial displacement of the contact section 20 may occur.

By being generally axially displaceable without any substantial radial displacement (or at most minimal radial displacement), the elongated section 22 is able to both accommodate axial displacement of the engagement surface S (i.e., due to relative axial movement between the inner member 1 and the outer member 2) and enables the seal assembly 10 to be installed in different applications with a varying axial distance DA between the case 12 and the engagement surface S/inner case radial portion 13b without any substantial circumferential stretching of the seal body 14. As such, the seal assembly 10 may be used in applications in which radial space is limited. Also, such circumferential stretching of previously known axial seals increases the loading between a seal body and a radial engagement surface and restricts the use of such seals in applications with minimal available radial space for radially outward displacement.

Referring again to FIGS. 2, 9, 11 and 13, the contact section 20 of the seal body outer portion 18 preferably extends both axially and radially (either outwardly in the first and fourth constructions or inwardly second and third constructions) from the outer end 22b of the elongated section 22 of the seal body outer portion 18. The contact section 20 has an annular outer edge 23 providing the free end 18a of the seal body outer portion 18 and is sealingly engageable with the radial engagement surface S. Preferably, the contact section 20 of the seal body outer portion 18 is sized, i.e., has sufficient axial length, such that an annular space AS for receiving a portion of another axial lip 4 is defined between the elongated section 22 of the seal body outer portion 18 and the radial engagement surface S when the contact section 20 contacts the engagement surface S, as depicted in FIG. 7.

Further, the inner axial portion 16 of the seal body 14 preferably includes a base section 24 attached to the annular case 12 and a cantilever section 26 having an inner end 26a connected with the base portion 24 and an opposing outer end 26b. The inner end 22a of the elongated section 22a of the seal body outer portion 18 is connected with the outer end 26b of the cantilever section 26 of the seal body inner portion 16, such that the connection of the two ends 22a, 26b forms the integral hinge portion 17, which is generally U-shaped. As such, the outer portion elongated section 22 is bendable about the outer end 26b of the inner portion cantilever section 26 to axially displace the seal body outer portion 18 relative to the first annular case 12.

Preferably, the cantilever section 26 is configured to bend about the base section 24 when the elongated section 22 of the seal body outer portion 18 bends about the cantilever section outer end 26b, as indicated by arrows in FIG. 3. Specifically, the seal body inner portion 16 is preferably formed such that the cantilever section 26 extends both axially and radially inwardly from the base section 24 in the first and fourth constructions and axially and radially outwardly in the second and third constructions. As such, the seal body 14 is configured to collapse and alternatively expand generally in the manner of a bellows.

That is, the seal body 14 is capable of "collapsing" by bending of the outer portion elongated section 22 about the cantilever section 26 generally toward the annular case 12 while the cantilever section 26 bends radially inwardly (first and fourth seal constructions), or radially outwardly (second and third seal constructions), about the base section 24 and toward the case 12, thus allowing inward axial displacement of the seal body outer portion 18 without any substantial radial displacement of the seal contact section 20. Conversely, the seal body 14 is capable of "expanding" by bending of the outer portion elongated section 22 about the cantilever section 26 generally away from the case 12 while the cantilever section 26 bends radially outwardly, or radially inwardly, about the base section 24 and away from the case 12, thereby enabling outward axial displacement of the seal body outer portion 18 without any substantial radial displacement of the seal contact section 20.

Although the seal body 14 is preferably formed having an inner axial portion 16 that includes both a base section 24 and a cantilever section 26, the seal body inner portion 16 may alternatively be formed without any cantilever section and in which the outer portion elongated section 22 is instead connected directly with an appropriately formed inner portion base section, such that the hinge portion 17 is formed between the base section and the elongated section 22.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An axial seal assembly for sealing against a radial engagement surface, the radial engagement surface extending from or formed on either an outer member or an inner member disposed within a bore of the outer member, the inner member or the outer member being rotatable about a central axis extending through the inner member, the axial seal assembly comprising:

an annular case coupleable with the bore of the outer member or disposable about and coupled with the inner member; and an annular elastomeric seal body including an inner portion attached to the annular case and an outer portion extending axially and radially from the inner portion so as to positionable generally parallel to the radial engagement surface, the outer portion having a contact section extending generally axially from a remainder of the outer portion and being sealingly engageable with the radial engagement surface, the outer portion being configured to bend with respect to the inner portion such that the outer portion remains generally parallel to the engagement surface during relative axial displacement between the annular case and the engagement surface;

wherein the inner portion of the seal body has a base section attached to the annular case and a cantilever section having an inner end connected with the base section and an opposing outer end, the outer portion of the seal body having an inner end connected with the outer end of the cantilever section, the outer portion being bendable about the outer end of the cantilever section in a first angular direction while the cantilever section is configured to bend about the base section in an opposing, second angular direction such that the outer portion displaces axially relative to the annular case.

2. The axial seal assembly as recited in claim 1 wherein the elongated section of the outer portion extends axially and radially outwardly from the cantilever section of the inner portion.

3. The axial seal assembly as recited in claim 2 wherein the cantilever section of the inner portion extends axially and radially inwardly from the base section of the inner portion.

4. The axial seal assembly as recited in claim 1 wherein the contact section of the outer portion is sized such that an annular space for receiving a portion of another axial lip is defined between the elongated section of the outer portion and the radial engagement surface when the contact section contacts the radial engagement surface.

5. The axial seal assembly as recited in claim 1 wherein the annular case includes an axial portion frictionally engageable with the bore of the outer member or an outer circumferential surface of the inner member and a radial portion extending radially from and integrally formed with the axial portion, the seal body being attached to the radial portion of the case.

* * * * *